(12) United States Patent
Dupuy

(10) Patent No.: US 9,181,915 B2
(45) Date of Patent: Nov. 10, 2015

(54) ENGINE AUTOMATIC STOP/START MECHANISM

(75) Inventor: James A. Dupuy, Endicott, NY (US)

(73) Assignee: BAE SYSTEMS CONTROLS INC., Endicott, NY (US)

( * ) Notice: Subject to any disclaimer, the term of this patent is extended or adjusted under 35 U.S.C. 154(b) by 1044 days.

(21) Appl. No.: 13/286,768

(22) Filed: Nov. 1, 2011

(65) Prior Publication Data

US 2013/0054060 A1    Feb. 28, 2013

Related U.S. Application Data

(60) Provisional application No. 61/529,569, filed on Aug. 31, 2011.

(51) Int. Cl.
*F02D 17/04* (2006.01)
*F02N 11/08* (2006.01)
*F02D 29/02* (2006.01)

(52) U.S. Cl.
CPC ............ *F02N 11/0825* (2013.01); *F02D 17/04* (2013.01); *F02D 29/02* (2013.01); *F02N 11/0829* (2013.01); *F02D 2200/501* (2013.01); *F02D 2200/604* (2013.01); *F02N 11/0822* (2013.01); *F02N 2200/023* (2013.01); *F02N 2200/061* (2013.01); *F02N 2200/0801* (2013.01); *Y02T 10/48* (2013.01); *Y02T 10/6286* (2013.01)

(58) Field of Classification Search
USPC ......................................................... 701/112
See application file for complete search history.

(56) References Cited

U.S. PATENT DOCUMENTS

| | | | | |
|---|---|---|---|---|
| 6,161,640 | A * | 12/2000 | Yamaguchi | 180/65.8 |
| 6,621,175 | B1 * | 9/2003 | Kuroda et al. | 290/40 D |
| 7,261,669 | B2 * | 8/2007 | Devita et al. | 477/3 |
| 2003/0173124 | A1 * | 9/2003 | Okada et al. | 180/65.2 |
| 2006/0217228 | A1 * | 9/2006 | Devita et al. | 477/3 |
| 2008/0066978 | A1 * | 3/2008 | Sugai et al. | 180/65.2 |
| 2009/0099759 | A1 * | 4/2009 | Sasaki | 701/113 |

* cited by examiner

*Primary Examiner* — Shelley Chen
(74) *Attorney, Agent, or Firm* — Scully, Scott, Murphy & Presser, P.C.

(57) ABSTRACT

An inventive system and method for managing vehicle power is presented. The novel technology provides a means to automatically shutdown a vehicle's engine when conditions are such that engine power is not needed, reducing fuel consumption as well as lowering noise and emissions. A series of conditions are examined to determine whether engine power is needed and hence whether shutdown can be safely performed. The inventive system and method can also determine when power is again needed by the engine and can re-start the engine automatically at such times.

3 Claims, 3 Drawing Sheets

ENGINE AUTOMATIC STOP/START MECHANISM

CROSS REFERENCE TO RELATED APPLICATIONS

The present invention claims the benefit of U.S. provisional patent application 61/529,569 filed Aug. 31, 2011, the entire contents and disclosure of which are incorporated herein by reference as if fully set forth herein.

FIELD OF THE INVENTION

The present invention generally relates to hybrid vehicles and engine stop/start capabilities of hybrid vehicles.

BACKGROUND OF THE INVENTION

Transit busses spend approximately fifty percent (50%) of the time at engine idle, consuming fuel even when very low or even no system power is needed. Other vehicles also consume fuel while idling and/or during times of low system power usage. Often, excessive fuel is consumed at these times. There is a need to reduce fuel consumption during periods of low system power demand; improving fuel consumption during the time that engine power is not needed would show significant fuel consumption improvement.

SUMMARY OF THE INVENTION

The inventive technology, called Vehicle Power Management System (VPMS) in this document, for managing vehicle power provides a means to automatically shutdown a vehicle's engine when conditions are such that engine power is not needed, reducing fuel consumption as well as lowering noise and emissions. The inventive system and method can also determine when power is again needed by the system and can re-start the engine automatically at such times.

In one aspect, a method for performing automatic engine stop of a hybrid vehicle having a battery comprises determining whether the engine is in test mode, determining whether automatic shutdown authorization is asserted, and determining whether state of charge of the battery is above a predetermined charge limit, and performing the automatic engine stop when the engine is not in the test mode, the automatic shutdown authorization is asserted and the state of charge of the batter is above the predetermined limit.

In one aspect, a method for performing automatic engine start of a hybrid vehicle having a battery comprises determining whether the engine was shutdown using automatic shutdown, determining whether automatic engine authorization is asserted, determining whether state of charge of the battery is below a predetermined charge limit, and performing the automatic engine start when the engine was shutdown using automatic shutdown, the automatic engine authorization is asserted and the state of charge of the battery is below a predetermined charge limit.

In one aspect, a method for performing automatic engine stop of a hybrid vehicle having a battery comprises determining whether the engine is in test mode, determining whether the engine is in high idle, determining whether automatic shutdown authorization is asserted, determining whether state of charge of the battery is above a predetermined charge limit, determining whether vehicle speed is less than a predetermined speed limit, determining whether the vehicle speed has exceeded a predetermined minimum moving speed limit since the last automatic engine shutdown, determining whether the engine has been running for at least a predetermined minimum engine run time limit, determining whether engine coolant temperature is within a predetermined range, determining whether generator power demand is less than a predetermined generator power demand limit, determining whether the vehicle has been in drive for at least a predetermined minimum drive time since one of key on and engine start, and performing the automatic engine stop when the engine is not in the test mode, the automatic shutdown authorization is asserted, and the state of charge of the battery is above the predetermined charge limit, unless one of: the engine is in high idle, the vehicle speed limit is greater than the predetermined speed limit, the engine coolant temperature is not within the predetermined range, the generator power demand is greater than a predetermined generator power demand limit, the vehicle has not been in drive for at least the predetermined minimum drive time since one of key on and engine start, and either the engine has not been running for at least the predetermined minimum engine run time limit or the vehicle speed has not exceeded the predetermined minimum moving speed limit since the last automatic engine shutdown.

In one aspect, a method for performing automatic engine start of a hybrid vehicle having a battery comprises determining whether the engine was shutdown using automatic shutdown, determining whether automatic engine authorization is asserted, determining whether state of charge of the battery is below a predetermined charge limit, determining whether engine coolant temperature is below a predetermined temperature limit, determining whether throttle depression is greater than a predetermined throttle limit, determining whether vehicle speed is greater than a predetermined speed limit, and performing the automatic engine start when the engine was shutdown using the automatic shutdown, the automatic engine authorization is asserted, and one of: the state of charge of the battery is below the predetermined charge limit, the engine coolant is below the predetermined coolant limit, the throttle depression is greater than the predetermined throttle limit, and the vehicle speed is greater than the predetermined speed limit.

In one aspect, a system for performing automatic engine stop comprises a vehicle having an engine and a battery, and a module operable to determine whether the engine is in test mode, whether the engine is in high idle, whether automatic shutdown authorization is asserted, whether state of charge of the battery is above a predetermined charge limit, whether vehicle speed is less than a predetermined speed limit, whether the vehicle speed has exceeded a predetermined minimum moving speed limit since the last automatic engine shutdown, whether the engine has been running for at least a predetermined minimum engine run time limit, whether engine coolant temperature is within a predetermined range, whether generator power demand is less than a predetermined generator power demand limit, whether the vehicle has been in drive for at least a predetermined minimum drive time since one of key on and engine start, and to perform the automatic engine stop when the engine is not in the test mode, the automatic shutdown authorization is asserted, and the state of charge of the battery is above the predetermined charge limit, unless one of: the engine is in high idle, the vehicle speed limit is greater than the predetermined speed limit, the engine coolant temperature is not within the predetermined range, the generator power demand is greater than a predetermined generator power demand limit, the vehicle has not been in drive for at least the predetermined minimum drive time since one of key on and engine start, and either the engine has not been running for at least the predetermined minimum engine run time limit or the vehicle speed has not exceeded the predetermined minimum moving speed limit since the last automatic engine shutdown.

In one aspect, a system for performing automatic engine start comprises a vehicle having an engine and a battery and a module operable to determine whether the engine was shutdown using automatic shutdown and whether automatic engine authorization is asserted and whether state of charge of the battery is below a predetermined charge limit and whether engine coolant temperature is below a predetermined temperature limit and whether throttle depression is greater than a predetermined throttle limit and whether vehicle speed is greater than a predetermined speed limit and to perform the automatic engine start when the engine was shutdown using the automatic shutdown, the automatic engine authorization is asserted, and one of: the state of charge of the battery is below the predetermined charge limit, the engine coolant is below the predetermined coolant limit, the throttle depression is greater than the predetermined throttle limit, and the vehicle speed is greater than the predetermined speed limit.

A computer readable storage medium storing a program of instructions executable by a machine to perform one or more methods described herein also may be provided.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION OF THE INVENTION

An inventive system and method for managing vehicle power, VPMS, is presented. The novel technique stops a vehicle's engine and uses battery power during low power demands and automatically restarts the engine, for example by using an Integrated Starter Generator (ISG), when the power demand cannot be met by the stored energy in the batteries.

The inventive technology includes a series of functions or engine Stop/Start features which determine whether the engine can be stopped and/or started based on existing vehicle conditions.

Figure 1:
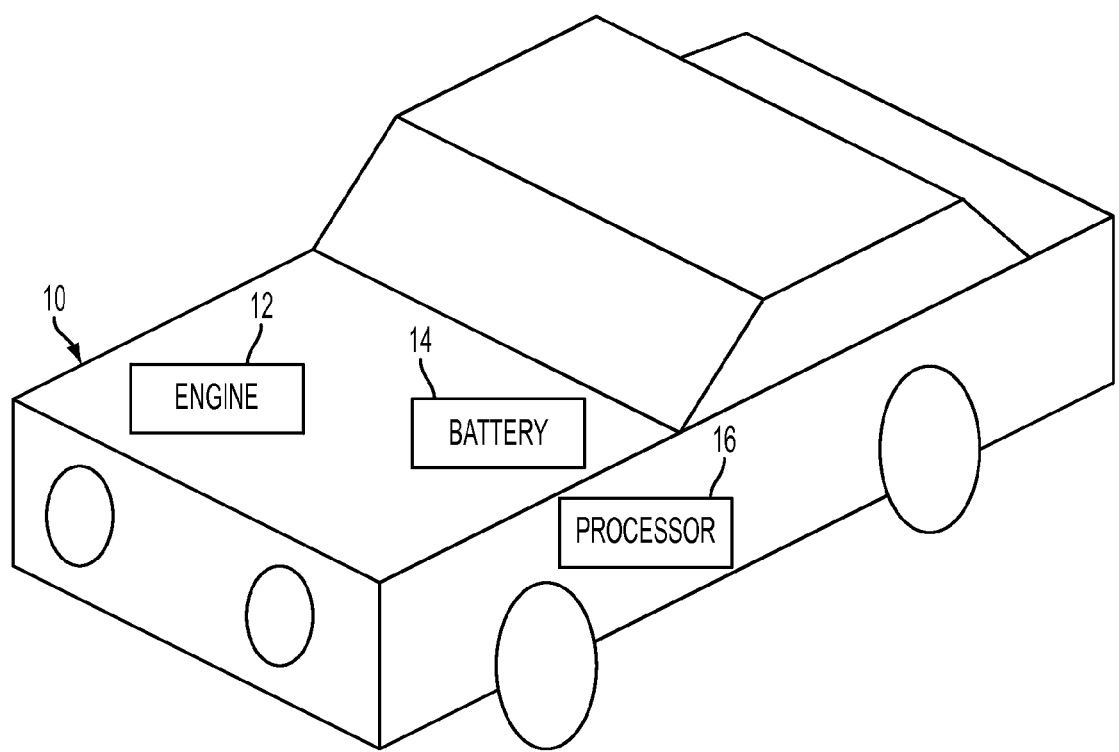
FIG. 1 is a schematic diagram of the inventive system.

FIG. 1 is a schematic diagram of the inventive system. The system comprises a vehicle 10 having an engine 12, a battery 14 and a processor 16 which can perform the inventive method. For example the processor 16 can execute the software comprising VPMS.

The VPMS system can be deployed on several different platforms, such as a variety of transit busses. Each of these platforms is unique and has different features. Each platform is referred to herein as an "Application".

In one aspect, engine stop/start function of VPMS can be capable of being enabled either at build time or via non-volatile memory (NVM) adjustment. This provides a simple mechanism for applications that have implemented this function to enable/disable the engine stop/start feature. If desired, making VPMS NVM adjustable allows it to be selectable for different properties.

Authorization input that prevents automatic engine shutdown when de-asserted can be provided, to address situations when stopping the engine is undesirable. Such input authorization enables the automatic engine shutdown to be handled on a vehicle by vehicle basis due to differences in the system configuration. This mechanism provides each application with the ability to configure a unique interlock mechanism. This can provide the ability, such as for application-unique control, for example by enabling generic input.

In addition, an authorization input that prevents automatic engine start when de-asserted can also address situations when starting the engine is unsafe, e.g., if the engine bay door is open. As discussed above, such authorization input enables the automatic engine shutdown to be handled on a vehicle by vehicle basis due to differences in the system configuration.

In the inventive technology, several conditions must be satisfied before engine shutdown or stop can occur. These conditions prevent overall engine and vehicle malfunctions, as well as serving as safety mechanisms. The conditions include things such as engine mode, vehicle speed, engine coolant temperature, generator power demand and amount of time the engine has been in drive.

In particular, an automatic engine shutdown can be initiated when all of the following conditions are satisfied: Engine test mode switch is not asserted, high idle is not asserted, automatic engine shutdown authorization is asserted, State-of-Charge (SoC) is above a predetermined limit for SoC, e.g., AutoShutdownSoCLim, vehicle speed is less than a predetermined speed limit, e.g., AutoShutdownSpeedLim, vehicle speed has exceeded a predetermined minimum moving speed limit, e.g., AutoShutdownMinMovingSpeed, since the last automatic engine shutdown OR the engine has been running for at least a predetermined minimum engine run time limit, e.g., AutoShutdownMinEngRunTime, engine coolant temperature is greater than a predetermined minimum, e.g., AutoShutdownEngCoolantMin, and less than a predetermined maximum, e.g., AutoShutdownEngCoolantMax, generator power demand is less than a predetermined generator power demand limit, e.g., AutoShutdownGenPwrLim, and the vehicle has been in Drive for at least a predetermined minimum drive time, e.g., Min_Drive_Mode_Time since key on/engine start.

Specifically, the system cannot shut down when the Engine Test Mode switch is on or active; this prevents a shut down of the engine during test mode. Similarly, the system cannot shut down when in high idle, so that if some external situation is requiring that the engine be in high idle, perhaps a belt-driven air compressor is running or driver is requesting high idle for air conditioning, then the system will not shut the engine down. Further, as discussed above, if automatic engine shutdown authorization is de-asserted, the system cannot be shutdown, so automatic engine shutdown authorization must be asserted for system shutdown to occur.

To ensure that the batteries are in a known state within regulation limits and have enough energy to provide some traction and/or accessory power while the generator is offline, the SoC must be above a predetermined limit for system shutdown to occur. Similarly, to ensure that a stop is near and that traction motor power demand will not require full power immediately, vehicle speed must be less than a predetermined limit for system shutdown to occur. In addition, to ensure that the system does not enter a cycle between engine off and on modes, vehicle speed must have exceeded the predetermined minimum speed since the last automatic engine shutdown. In the alternative, the engine must have been running for at least a predetermined number of seconds for system shutdown to occur.

Further, to ensure that engine is warmed up before enabling shutdown and to ensure that the engine is not so hot that it may require coolant flow or fan, engine coolant temperature must be greater than a predetermined minimum and less than a predetermined maximum for system shutdown to occur. Also, to ensure that the engine is not shutdown when some reasonable amount of generator power is required, generator power demand must be less than a predetermined amount for system shutdown to occur. This could be due to traction motor power demand or vehicle accessory power demand (e.g. air conditioning, alternator, etc.) such that it would be less efficient to pull the power from the batteries. Keeping this value low will also ensure that the engine remains near idle, so additional logic will not be needed to ramp the engine down before shutdown.

Also, to ensure that the engine is not immediately shut down prior to the vehicle leaving the depot, the vehicle must have been in drive for at least a predetermined amount of time after the key was turned on and/or the engine was started.

The Engine Stop/Start function can only initiate an automatic engine start when the previous engine shutdown was an automatic engine shutdown, in accordance with the above requirements, and the automatic engine start authorization is asserted, and any of the following conditions are satisfied. A first condition is that SoC is below a predetermined limit, so that the batteries are not excessively depleted. The predetermined limit must not be set too low, to prevent fully depleting the batteries before the engine is re-started. A second condition is that the engine coolant temperature is below a predetermined limit. It is desirable to prevent the engine from cooling down too much (this is really the operating range for engine—it may be different for every engine). A third condition is that the throttle depression is greater than a predetermined limit, so that the engine can be started soon enough on a significant acceleration to avoid effecting performance. A fourth condition is that vehicle speed is greater than a predetermined limit, so that the engine is started before the traction motor exceeds its base speed, e.g., maximum power region; otherwise performance may be limited.

The Engine Stop/Start function can set a fault if, following an automatic engine shutdown, any of the conditions for restarting the engine are met and the engine is not re-started within a predetermined number, e.g., AutoStartFailedPersistence, of seconds. There may be some instances when re-start of the engine is expected but it cannot re-start, for example, either to due to interlock violation or simply the engine fails to start. This failure needs to be recorded in the fault log since performance will be affected.

The system can shutdown if the Engine Stop/Start function has shutdown the engine and the system is inactive for a given number, e.g., fifteen, minutes. This is similar to the current idle shutdown, which is typically fifteen minutes. This can be tied into the System Inactive shutdown. A typical transit bus (or almost any heavy-duty vehicle) has a mechanism for shutting down the engine if it's simply sitting at idle in neutral. This typically is required by the EPA as a pollution prevention mechanism.

The system can respond to an external or manual engine start command if received when the engine has been automatically shutdown by the Engine Stop/Start function. This provides the vehicle with the capability to manually start the engine if desired.

The system can limit the traction motor propulsive performance if the Engine Stop/Start function is enabled and the engine is not running and the vehicle exceeds a speed of a predetermined value, e.g., EV_Mode_Speed_Foldback_Begin. When another predetermined value, e.g., EV_Mode_Speed_Foldback_End, is reached, the power to the battery can be reduced. This enables limiting vehicle performance to lower speeds and/or powers so that battery limitations are not exceeded.

The system can provide an indication that the engine has been shutdown due to the Engine Stop/Start function. This provides a mechanism for vehicles to annunciate that the engine has been intentionally shutdown due to the stop/start function.

Table 1 is a list of sample parameters including predetermined values for one embodiment of the invention.

TABLE 1

| Parameter Name | Default Value | Implementation Notes |
|---|---|---|
| AutoShutdownSoCLim | 35% | |
| AutoShutdownSpeedLim | 2 MPH | |
| AutoShutdownMinMovingSpeed | 10 MPH | |
| AutoShutdownMinEngRunTime | 60 sec | |
| AutoShutdownEngCoolantMin | 65 deg C. | |
| AutoShutdownEngCoolantMax | 95 deg C. | |
| AutoShutdownGenPwrLim | 10 KW | |
| Min_Drive_Mode_Time | 300 sec | |
| AutoStartSoCLim | 30% | |
| AutoStartEngineCoolantLim | 60 deg C. | |
| AutoStartThrottleLim | 40% | |
| AutoStartSpeedLim | 5 MPH | May need to be adjusted depending on the base speed of the ACTM and gear ratios |
| AutoStartFailedPersistence | 30 sec | |
| EV_Mode_Speed_Foldback_Begin | 5 MPH | May need to be adjusted depending on the base speed of the ACTM and gear ratios |
| EV_Mode_Speed_Foldback_End | 10 MPH | May need to be adjusted depending on the base speed of the ACTM and gear ratios |

The inventive technique reduces vehicle fuel consumption during periods of low power demand. This advantageously avoids the use of fuel by the engine during times when the vehicle has low power demand.

Figure 2:
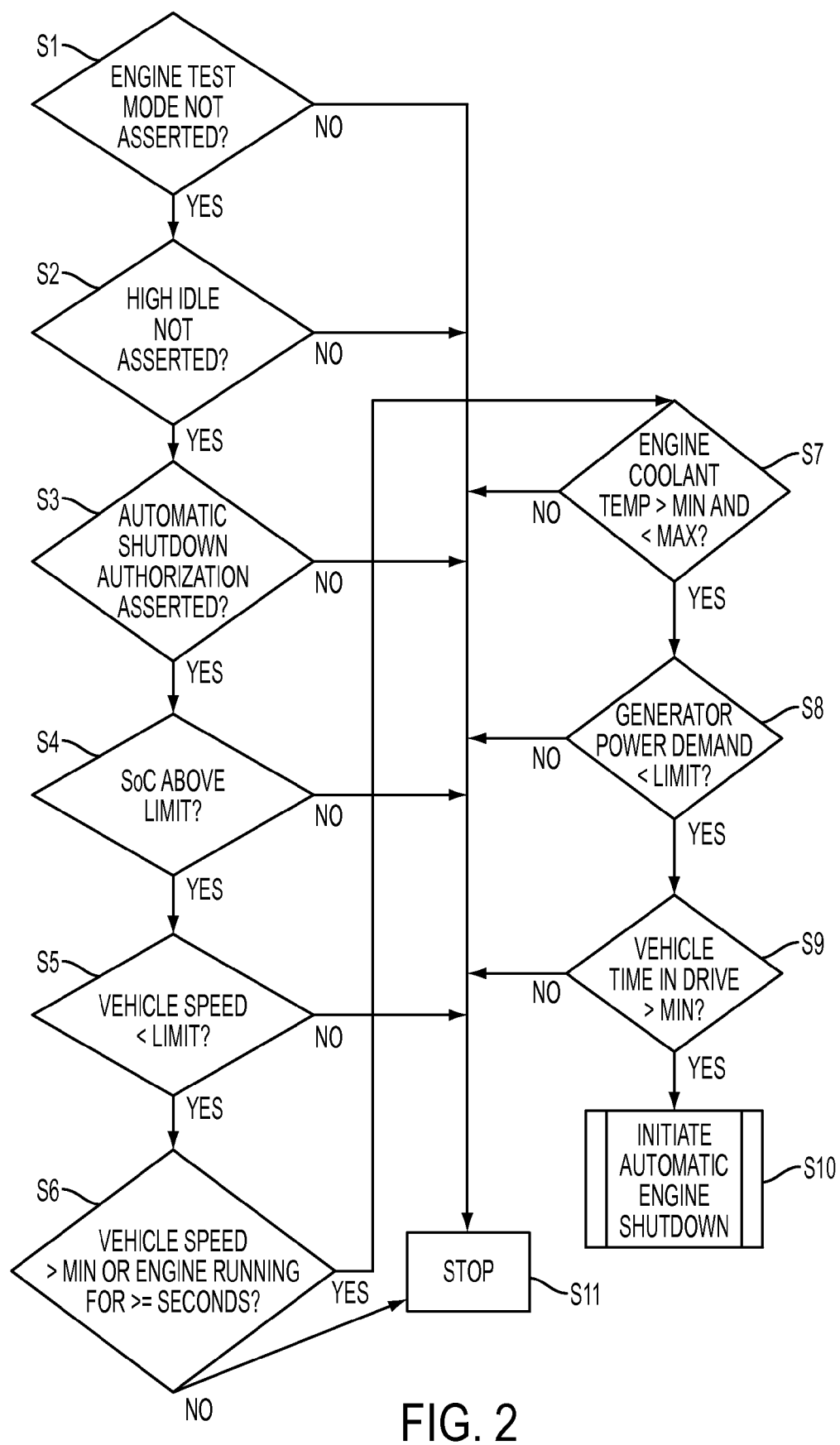
FIG. 2 is a flow diagram of the stop engine feature of the inventive method.

FIG. 2 is a flow diagram of the stop feature of the inventive method. As discussed above, the stop feature determines the status of a variety of features and if all of conditions are satisfied, the stop feature is initiated. In step S1, it is determined whether the engine test mode is not asserted, that is, whether the engine is in test mode. If not (S1=YES), in step S2, it is determined whether high idle is not asserted, that is, whether the engine is in high idle. If not (S2=YES), in step S3, it is determined whether automatic shutdown authorization is asserted. If it is (S3=YES), in step S4, it is determined whether SoC is above a predetermined limit. If it is (S4=YES), in step S5, it is determined whether the vehicle speed limit is less than a predetermined speed limit. If it is (S5=YES), in step S6, it is determined whether either the vehicle speed has exceeded a predetermined minimum moving speed limit since the last automatic engine shutdown, or the engine has been running for at least a predetermined minimum engine run time limit. If either the vehicle speed or the engine run time are in the acceptable range, then processing continues in step S7. In step S7, it is determined whether the engine coolant temperature is within a predetermined range, that is, greater than a predetermined minimum and less than a predetermined maximum. If the temperature is in the predetermined range (S7=YES), in step S8, it is determined whether the generator power demand is less than a predetermined generator power demand limit. If it is (S8=YES), in step S9, it is determined whether the vehicle has been in Drive for at least a predetermined minimum drive time since key on/engine start. If it is (S9=YES), then the automatic engine shutdown is initiated, in step S10.

Otherwise, if S1=NO or S2=NO or S3=NO or S4=NO or S5=NO or S6=NO or S7=NO or S8=NO or S9=NO, then the procedure stops in step S11.

Figure 3:
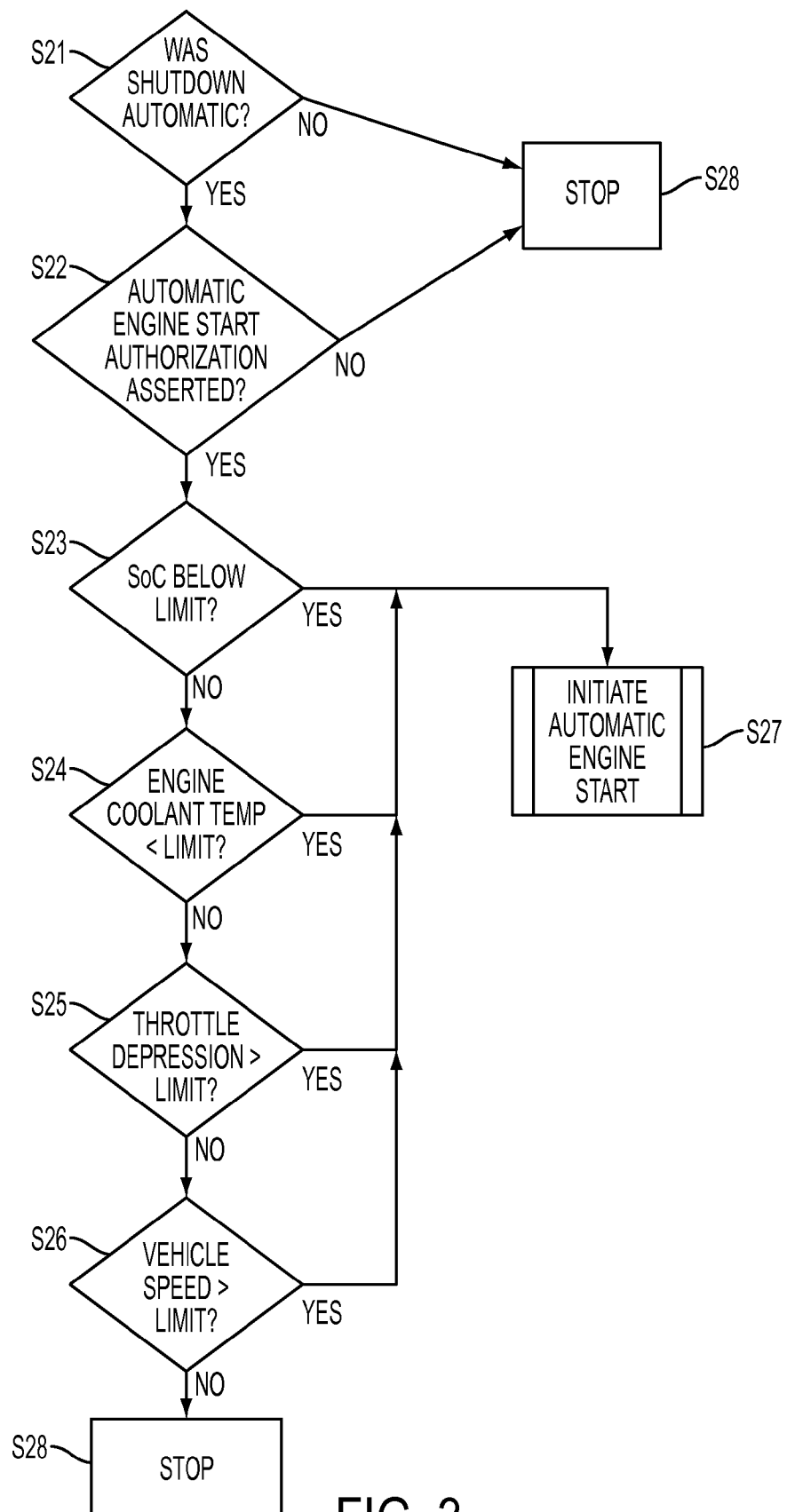
FIG. 3 is a flow diagram of the start engine feature of the inventive method.

FIG. 3 is a flow diagram of the start feature of the inventive method. As discussed above, the start feature determines the status of a variety of features and if certain conditions are satisfied, the start feature is initiated. In step S21, it is determined whether the engine was shutdown using automatic shutdown. If so (S21=YES), in step S22, it is determined whether the automatic engine authorization is asserted. If so (S22=YES), in step S23, it is determined whether SoC is below a predetermined limit. If it is (S23=YES), then automatic engine start can be initiated in step S27.

If SoC is not below the predetermined limit (S23=NO), then in step S24 it is determined whether the engine coolant temperature is below a predetermined limit. If so (S24=YES), then automatic engine start can be initiated in step S27.

If the engine coolant temperature is above the predetermined limit (S24=NO), then in step S25 it is determined whether the throttle depression is greater than a predetermined limit. If so (S25=YES), then automatic engine start can be initiated in step S27.

If the throttle depression is less than the predetermined limit, in step S26 it is determined whether the vehicle speed is greater than a predetermined limit. If so (S26=YES), then automatic engine start can be initiated in step S27.

Otherwise if S21=NO or S22=NO or S26=NO, the procedure stops in step S28.

Various aspects of the present disclosure may be embodied as a program, software, or computer instructions embodied or stored in a computer or machine usable or readable medium, which causes the computer or machine to perform the steps of the method when executed on the computer, processor, and/or machine. A program storage device readable by a machine, e.g., a computer readable medium, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The computer readable medium could be a computer readable storage medium or a computer readable signal medium. Regarding a computer readable storage medium, it may be, for example, a magnetic, optical, electronic, electromagnetic, infrared, or semiconductor system, apparatus, or device, or any suitable combination of the foregoing; however, the computer readable storage medium is not limited to these examples. Additional particular examples of the computer readable storage medium can include: a portable computer diskette, a hard disk, a magnetic storage device, a portable compact disc read-only memory (CD-ROM), a random access memory (RAM), a read-only memory (ROM), an erasable programmable read-only memory (EPROM or Flash memory), an electrical connection having one or more wires, an optical fiber, an optical storage device, or any appropriate combination of the foregoing; however, the computer readable storage medium is also not limited to these examples. Any tangible medium that can contain, or store a program for use by or in connection with an instruction execution system, apparatus, or device could be a computer readable storage medium.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

What is claimed is:

1. A method for performing automatic engine stop of a hybrid vehicle having a battery, the method comprising steps of:
   determining whether the engine is in test mode;
   determining whether the engine is in high idle;
   determining whether automatic shutdown authorization is asserted;
   determining whether a state of charge of the battery is above a predetermined charge limit;
   determining whether the vehicle speed is less than a predetermined speed limit;
   determining whether the vehicle speed has exceeded a predetermined minimum moving speed limit since the last automatic engine shutdown;
   determining whether the engine has been running for at least a predetermined minimum engine run time limit;
   determining whether engine coolant temperature is within a predetermined range;
   determining whether generator power demand is less than a predetermined generator power demand limit;
   determining whether the vehicle has been in drive for at least a predetermined minimum drive time since one of key on and engine start; and
   performing the automatic engine stop when the engine is not in the test mode, the automatic shutdown authorization is asserted, and the state of charge of the battery is above the predetermined charge limit, unless at least one of: (1) the engine is in high idle, (2) the vehicle speed is greater than the predetermined speed limit, (3) the engine coolant temperature is not within the predetermined range, (4) the generator power demand is greater than a predetermined generator power demand limit, (5) the vehicle has not been in drive for at least the predetermined minimum drive time since one of key on and engine start, and (6) either: (a) the engine has not been running for at least the predetermined minimum engine run time limit, or (b) the vehicle speed has not exceeded the predetermined minimum moving speed limit since the last automatic engine shutdown.

2. A system for performing automatic engine stop, the system comprising:

a hybrid vehicle having an engine and a battery; and a module operable to determine whether the engine is in test mode and whether the engine is in high idle and whether automatic shutdown authorization is asserted and whether a state of charge of the battery is above a predetermined charge limit and whether the vehicle speed is less than a predetermined speed limit and whether the vehicle speed has exceeded a predetermined minimum moving speed limit since the last automatic engine shutdown and whether the engine has been running for at least a predetermined minimum engine run time limit and whether engine coolant temperature is within a predetermined range and whether generator power demand is less than a predetermined generator power demand limit and whether the vehicle has been in drive for at least a predetermined minimum drive time since one of key on and engine start; and wherein the module is further operable to perform the automatic engine stop when the engine is not in the test mode, the automatic shutdown authorization is asserted, and the state of charge of the battery is above the predetermined charge limit, unless at least one of: (1) the engine is in high idle, (2) the vehicle speed is greater than the predetermined speed limit, (3) the engine coolant temperature is not within the predetermined range, (4) the generator power demand is greater than a predetermined generator power demand limit, (5) the vehicle has not been in drive for at least the predetermined minimum drive time since one of key on and engine start, and (6) either: (a) the engine has not been running for at least the predetermined minimum engine run time limit, or (b) the vehicle speed has not exceeded the predetermined minimum moving speed limit since the last automatic engine shutdown.

3. A computer readable storage medium storing a program of instructions executable by a machine to perform automatic engine stop for a hybrid vehicle having an engine and a battery, the program of instructions being configured to provide steps comprising:

determining whether the engine is in test mode;

determining whether the engine is in high idle;

determining whether automatic shutdown authorization is asserted;

determining whether a state of charge of the battery is above a predetermined charge limit;

determining whether the vehicle speed is less than a predetermined speed limit;

determining whether the vehicle speed has exceeded a predetermined minimum moving speed limit since the last automatic engine shutdown;

determining whether the engine has been running for at least a predetermined minimum engine run time limit;

determining whether engine coolant temperature is within a predetermined range;

determining whether generator power demand is less than a predetermined generator power demand limit;

determining whether the vehicle has been in drive for at least a predetermined minimum drive time since one of key on and engine start; and performing the automatic engine stop when the engine is not in the test mode, the automatic shutdown authorization is asserted, and the state of charge of the battery is above the predetermined charge limit, unless at least one of: (1) the engine is in high idle, (2) the vehicle speed is greater than the predetermined speed limit, (3) the engine coolant temperature is not within the predetermined range, (4) the generator power demand is greater than a predetermined generator power demand limit, (5) the vehicle has not been in drive for at least the predetermined minimum drive time since one of key on and engine start, and (6) either: (a) the engine has not been running for at least the predetermined minimum engine run time limit, or (b) the vehicle speed has not exceeded the predetermined minimum moving speed limit since the last automatic engine shutdown.

* * * * *